United States Patent [19]

Hosaka et al.

[11] Patent Number: 4,609,588

[45] Date of Patent: Sep. 2, 1986

[54] MAGNETIC RECORDING MEDIUM

[75] Inventors: Akihiko Hosaka; Kiyotaka Okuyama; Kiyosumi Kanazawa, all of Tokyo, Japan

[73] Assignee: TDK Corporation, Tokyo, Japan

[21] Appl. No.: 493,238

[22] Filed: May 10, 1983

[30] Foreign Application Priority Data

May 20, 1982 [JP] Japan .................................. 57-83942

[51] Int. Cl.$^4$ .............................................. G11B 5/70
[52] U.S. Cl. .................... 428/329; 360/134; 360/135; 360/136; 252/62.54; 427/128; 428/694; 428/900
[58] Field of Search ............... 428/694, 695, 900, 329; 427/128; 360/134–136; 252/62.54

[56] References Cited

U.S. PATENT DOCUMENTS

| | | | |
|---|---|---|---|
| 4,015,042 | 3/1977 | Chassaigne | 428/329 |
| 4,323,596 | 4/1982 | Buxbaum et al. | 427/127 |
| 4,399,189 | 8/1983 | Nakashima et al. | 428/694 |
| 4,420,408 | 12/1983 | Kajimoto | 428/900 |
| 4,423,452 | 12/1983 | Kajimoto | 428/694 |
| 4,425,400 | 1/1984 | Yamaguchi et al. | 428/329 |
| 4,448,842 | 5/1984 | Yamaguchi et al. | 428/329 |

*Primary Examiner*—Ellis P. Robinson
*Attorney, Agent, or Firm*—Oblon, Fisher, Spivak, McClelland & Maier

[57] ABSTRACT

A magnetic recording medium comprises a magnetic layer coated on a substrate and composed of ferromagnetic powder dispersed in a binder, wherein the magnetic layer contains $TiO_2$ having an average particle size of at most 8 μm and a surface area of at most 25 m$^2$/g as measured by a nitrogen adsorption method, and $Al_2O_3$ having an average particle size of at least 0.1 μm and a surface area of at most 30 m$^2$/g as measured by a nitrogen adsorption method.

4 Claims, No Drawings

MAGNETIC RECORDING MEDIUM

BACKGROUND OF THE INVENTION

1. Field of the Invention

The present invention relates to a magnetic recording medium. More particularly, it relates to a composition which constitutes a superior magnetic recording layer in a magnetic recording medium such as a video tape or a computer tape for which durability is required.

2. Description of the Prior Art

The magnetic recording medium such as a video tape or computer tape is brought in contact and frictional engagement with a magnetic head under a high speed, and the magnetic coating layer is likely to be damaged. Accordingly, a magnetic recording medium having superior durability is required. To meet this requirement, a magnetic recording medium has been proposed which has a magnetic coating layer containing from about 1 to about 25% by weight, based on the magnetic powder, of non-magnetic powder having a particle size of at most 5 μm and a Mohs' hardness at least 6. With this magnetic recording medium, the abrasion resistance of the magnetic coating layer is sufficiently improved, but the abrasion of the magnetic head and the decrease in the S/N ratio become substantial, whereby it becomes very difficult to control the abrasion of the magnetic head or the decrease of the S/N ratio and in an extreme case, it is likely that the magnetic head is damaged or the surface of the magnetic head is roughened. Further, when such non-magnetic powder is used in a substantial amount, unwanted substances derived from the abrasion of a dispersing machine during the dispersing operation, are likely to be incorporated, whereby in many cases, the physical property of the binder will be modified and in an extreme case, the coating material tends to be gelled. Thus, when applied to a substrate such coating material has often led to an inferior finish of the surface or deterioration of the electromagnetic conversion characteristics.

Under the circumstances, the present inventors have conducted extensive researches to overcome such difficulties and as a result have found that when two specific types of non-magnetic powders having specific average particle sizes and surface areas are used as a mixture, it is possible to obtain far superior effectiveness as compared with the case where various non-magnetic powders heretofore are used.

SUMMARY OF THE INVENTION

The, the present invention provides a magnetic recording medium comprising a magnetic layer coated on a substrate and composed of ferromagnetic powder dispersed in a binder, which is characterized in that the magnetic layer contains $TiO_2$ having an average particle size of at most 0.8 μm and a surface area of at most 25 $m^2/g$ as measured by a nitrogen adsorption method, and $Al_2O_3$ having an average particle size of at least 0.1 μm and a surface area of at most 30 $m^2/g$ as measured by a nitrogen adsorption method.

Now, the present invention will be described in detail with reference to the preferred embodiment.

DESCRIPTION OF THE PREFERRED EMBODIMENTS

The present invention is characterized in that among various non-magnetic powers, $TiO_2$ having an average particle size of at most 0.8 μm and a surface area of at most 25 $m^2/g$ as measured by a nitrogen adsorption method $Al_2O_3$ having a particle size of at least 0.1 μm and a surface area of at most 30 $m^2/g$ as measured by a nitrogen adsorption method are used in combination. By the combined use of the two specific types of non-magnetic powders, it is possible, with an addition of a relatively small amount of the non-magnetic powders, to minimize the abrasion of the magnetic head and to prevent the discoloration of the surface layer of the head and the scratching on the head surface which are likely to be caused by the high speed frictional engagement of the magnetic recording tape with the magnetic recording head, whereby it is possible to control the abrasion of the head within an optional limited while maintaining the S/N ratio and the frequency characteristic at high levels. Thus, it is possible to provide a magnetic recording medium having superior durability and capable of ensuring that the head surface be maintained to be smooth and in good condition.

The use of $TiO_2$ powder or $Al_2O_3$ powder has already been proposed. However, it has never been proposed to use them in combination taking into account their surface areas and particle sizes. According to the present invention, unexpectedly superior effects can be attained by the combined use of $TiO_2$ and $Al_2O_3$ powders having the above-mentioned specific surface areas and particle sizes.

As $TiO_2$ to be used as one of the non-magnetic powders of the present invention, those known by the trade names R-820, R-580 and TY-50 manufactured by Ishihara Sangyo Kaisha Ltd. are particularly useful. As $Al_2O_3$, those known by the trade names AKP-20 and AKP-30 manufactured by Sumitomo Chemical Co., Ltd. are useful.

In order to obtain superior characteristics for both the magnetic head and the magnetic recording medium, i.e. to minimize e.g. the head surface roughening, the head abrasion, the degradation of the S/N ratio and the reduction of the reproduction output, it is preferred that the above-mentioned two types of non-magnetic powders are mixed in a ratio of $TiO_2$ to $Al_2O_3$ within a range of from 7:3 to 3:7 weight. This mixture is preferably used in an amount of from 1 to 15 parts by weight, more preferably from 3 to 6 parts by weight, based on 100 parts by weight of the magentic powder. If the ratio of the twoo powders is outside the above range of from 7:3 to 3:7, the synergistic effect of the two types of the non-magnetic powders tends to decrease. Further, if the total amount of the two powders is lower than the lower limit of the above range of from 1 to 15 parts by weight, no adequate effects of the non-magnetic powders are obtainable and if the total amount exceeds the upper limit, the non-magnetic powders tends to adversely affect the magnetic property.

The representative characteristics of the above-mentioned commercial products are as shown in Tables 1 and 2.

TABLE 1

| Properties | Trade name | |
|---|---|---|
| | AKP-20 | AKP-30 |
| Material | $Al_2O_3$ | $Al_2O_3$ |
| Purity (%) | at least 99.99 | at least 99.99 |
| Average particle size (μ) | 0.5 | 0.4 |
| Surface area ($m^2/g$) | 4–6 | 5–10 |

TABLE 2

| Properties | Trade name | | |
|---|---|---|---|
| | R-820 | R-580 | TY-50 |
| Amount of TiO$_2$ (%) | 93.0 | 94.0 | 78.0 |
| Major treating agent* | Al, Si, Zn | Al | Ni, Sb |
| Average particle size ($\mu$) | 0.325 | 0.4 | 0.6 |
| Surface area (m$^2$/g) | 22.0 | 19.0 | 17.0 |

*Surface treating agent for TiO$_2$ particles

Now, the present invention will be described in further detail with reference to Examples.

EXAMPLE 1

| | |
|---|---|
| $\gamma$—Fe$_2$O$_3$ | 350 parts by weight |
| Polyurethane resin | 40 parts by weight |
| Epoxy resin | 20 parts by weight |
| Nitro cellulose | 40 parts by weight |
| Dispersing agent (oleic acid) | 7 parts by weight |
| Lubricant (3 parts by weight of each of myristic acid and butyl stearate) | 6 parts by weight |
| Methyl ethyl ketone | 300 parts by weight |
| Methyl isobutyl ketone | 150 parts by weight |
| Cyclohexanone | 200 parts by weight |

The above components were introduced in a coating material dispersing machine and thoroughly mixed and dispersed. Then, polyisocyanate as a crosslinking agent (Colonate L manufactured by Nippon Polyurethane Co.) was added in an amount of 12% by weight based on the resin components, and the mixture was thoroughly stirred to obtain a uniform coating material. This coating material was applied onto a substrate made of a polyester film having a thickness of 15 $\mu$m to form a coating layer having a thickness of 5 $\mu$m. Then, the coating layer was subjected to subjected to super calender surface treatment and then cured at a temperature of 60° C. for about 24 hours to obtain a tape material. This tape material was cut in width of 12.65 mm to obtain a magnetic recording video tape. This tape was designated as Sample No. 1.

In the same manner as above, video tapes were prepared by incorporating the respective non-magnetic powders shown in Table 3 into the above-mentioned composition. These video tapes were designated as Sample Nos. 2 to 5.

TABLE 3

| Sample No. | Non-magnetic powders | |
|---|---|---|
| | AKP-20 (parts by weight) | R-580 (parts by weight) |
| 2 | 6.3 | 14.7 |
| 3 | 8.4 | 12.6 |
| 4 | 12.6 | 8.4 |
| 5 | 14.7 | 6.3 |

COMPARATIVE EXAMPLE 1

Video tapes were prepared in the same manner as in Example 1 except that 21 parts by weight of each of AKP-20 and R-580 was used alone. These video tapes were designated as Sample Nos. 6 and 7.

COMPARATIVE EXAMPLE 2

Video tapes were prepared in the same manner as in Example 1 except that the non-magnetic powders shown in Table 4 were used in the same ratio as in Sample No. 3. These video tapes were designated as Sample Nos. 8, 9 and 10.

TABLE 4

| Sample No. | Non-magnetic powders | |
|---|---|---|
| | Al$_2$O$_3$ | TiO$_2$ |
| 8 | Surface area 100 m$^2$/g | 40 m$^2$/g |
| | Average particle Size < 0.1 $\mu$ | 0.325 $\mu$ |
| 9 | 5 m$^2$/g | 11 m$^2$/g |
| | 1 $\mu$ | 1 $\mu$ |
| 10 | 100 m$^2$/g | 11 m$^2$/g |
| | < 0.1 $\mu$ | 1 $\mu$ |
| 11 | 5 m$^2$/g | 40 m$^2$/g |
| | 1 $\mu$ | 0.325 |

With respect to each of the video tapes thus obtained by Example 1 and Comparative Examples 1 and 2, the sensitivity at 5 MHz, the S/N ratio, the reduction of the reproduction output, the roughening of the head surface and the wearing of the magnetic head were measured. The results thereby obtained are shown in Table 5.

The sensitivity at 5 MHz and the S/N ratio were represented by relative values based on the respective values of Sample 1 being fixed as 0 (dB).

The reduction of the reproduction output was represented by the degree of the change in the sensitivity for the period of from the start of the reproduction to the end of the reproduction when the recorded video tape having an entire length of 245 m was run for reproduction.

The wearing of the magnetic head was represented by the degree of the wearing as measured after each video tape was continuously run for 10 hours.

TABLE 5

| | Measured items | | | | |
|---|---|---|---|---|---|
| Sample No. | Sensitivity at 5 MHz (dB) | S/N ratio (dB) | Reduction of the reproduction output (dB) | Head surface roughening | Wearing of the magnetic head ($\mu$m) |
| 1 | 0.0 | 0.0 | −6.5 | Substantial | 0.5 |
| 2 | 10.1 | −0.1 | −0.3 | None | 1.5 |
| 3 | 10.3 | 0.0 | −0.2 | None | 2.0 |
| 4 | −0.1 | 0.0 | 0.0 | None | 1.7 |
| 5 | 10.1 | −0.3 | −0.3 | None | 1.8 |
| 6 | −0.9 | −1.1 | −0.6 | Slight | 2.7 |
| 7 | −1.1 | −0.7 | −0.9 | Slight | 1.5 |
| 8 | −0.5 | −0.4 | −1.8 | Slight | 1.3 |
| 9 | −2.1 | −1.8 | −0.1 | Substantial | 4.5 |
| 10 | −1.0 | −1.4 | −1.3 | Slight | 3.0 |
| 11 | −0.7 | −0.5 | −0.6 | Slight | 2.0 |

It is evident from Table 5 that with the video tapes of Sample Nos. 2 to 5 wherein Al$_2$O$_3$ and TiO$_2$ were used in combination according to the present invention, it is possible to maintain the sensitivity, the S/N ratio and the reproduction output which are important for the magnetic tapes, in good conditions and at the same time good results are obtainable with respect to the surface roughening and abrasion of the magnetic head. Whereas, Sample Nos. 1 and 6 to 11 have a practical difficulty in at least one of the characteristics.

Thus, the present invention provides totally superior magnetic recording media in which various characteristics are all well balanced.

As the magnetic powder to be used in the present invention, not only $\gamma$—Fe$_2$O$_3$ used in Example 1 but also various other magnetic powders such as Co—$\gamma$-

$Fe_2O_3$, $CrO_2$, $Fe_3O_4$, dry process reduced metal power or wet process reduced metal powder may be used.

What is claimed as new and desired to be secured by Letters Patent of the United States is:

1. In a magnetic recording medium comprising a magentic layer coated on a substrate and composed of ferromagnetic powder dispersed in a binder, the improvement wherein the magnetic layer contains $TiO_2$ having an average particle size of at most 0.8 μm and a surface area of at most 25 m$^2$/g as measured by a nitrogen adsorption method, and $Al_2O_3$ having an average particle size of at least 0.1 μm and a surface area of at most 30 m$^2$/g as measured by a nitrogen adsorption method; wherein the magnetic medium has the following characteristics:

S/N > −0.3 dB,

Wearing of magnetic head < 1.8 μm, and

Sensitivity > −0.1 dB.

2. The magnetic recording medium according to claim 1 wherein the ratio of $TiO_2$ to $Al_2O_3$ is within a range of from 7:3 to 3:7 by weight.

3. The magnetic recording medium according to claim 1 wherein the total amount of $TiO_2$ and $Al_2O_3$ is within a range of from 1 to 15% by weight, based on the weight of the ferromagnetic powder.

4. The magnetic recording medium according to claim 2 wherein the total amount of $TiO_2$ and $Al_2O_3$ is within a range of from 1 to 15% by weight, based on the weight of the ferromagnetic powder.

* * * * *